US006848652B2

United States Patent
Palin et al.

(10) Patent No.: US 6,848,652 B2
(45) Date of Patent: Feb. 1, 2005

(54) AIRCRAFT HEATER

(75) Inventors: Harold J. Palin, Monroe, CT (US); Roger V. Backert, Monroe, CT (US); Curtis S. James, Woodbridge, CT (US); Anthony Schultz, Seymour, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/376,004

(22) Filed: Feb. 28, 2003

(65) Prior Publication Data

US 2004/0195444 A1 Oct. 7, 2004

(51) Int. Cl.⁷ .............................................. B64D 13/08
(52) U.S. Cl. ................................................. 244/118.5
(58) Field of Search ..................... 244/118.5; 236/13, 236/918, 49.3; 454/71, 76, 77, 83, 87, 99, 100

(56) References Cited

U.S. PATENT DOCUMENTS

| | | | | |
|---|---|---|---|---|
| 3,711,044 A | * | 1/1973 | Matulich ................. | 244/118.5 |
| 3,825,212 A | * | 7/1974 | Darges et al. ........... | 244/118.5 |
| 3,861,624 A | * | 1/1975 | Lear ........................ | 244/118.5 |
| 3,971,511 A | | 7/1976 | Casey | |
| 4,490,989 A | * | 1/1985 | Keen ........................... | 62/243 |
| 4,978,064 A | | 12/1990 | Steiner | |
| 5,165,597 A | | 11/1992 | Steiner | |
| 5,479,983 A | * | 1/1996 | Fischer et al. ............... | 165/205 |
| 5,897,079 A | * | 4/1999 | Specht et al. ............. | 244/118.5 |
| 6,012,515 A | | 1/2000 | Stubbendorff et al. | |
| 6,139,423 A | | 10/2000 | Wadey | |
| 6,216,981 B1 | * | 4/2001 | Helm ....................... | 244/118.5 |
| 6,619,589 B2 | * | 9/2003 | Brasseur et al. ......... | 244/118.5 |

* cited by examiner

*Primary Examiner*—Galen Barefoot
(74) *Attorney, Agent, or Firm*—Bachman & LaPointe, P.C.

(57) ABSTRACT

An aircraft heating system taps into a bleed air flowpath between a turbine engine and an external bleed air port on the aircraft. A system may be installed as a retrofit for heating the cabin of an aircraft already having a heating system for heating the cockpit.

20 Claims, 7 Drawing Sheets

AIRCRAFT HEATER

BACKGROUND OF THE INVENTION

(1) Field of the Invention

This invention relates to aircraft, and more particularly to heating systems for rotary wing aircraft.

(2) Description of the Related Art

Bleed air is for a variety of purposes in rotary-wing aircraft. An exemplary aircraft is the UH-60/S70 BLACK-HAWK by Sikorsky Aircraft Corporation, Stratford, Conn. The interior of this aircraft has a forward cockpit and a passenger cabin or compartment aft of the cockpit. A pair of port and starboard main turbine engines are located above the cabin below the main rotor. An auxiliary power unit (APU) having its own turbine is located high in the transition area behind the cabin. The compressors of the main engines and APU all produce bleed air which bypasses combustion. In a standard configuration, a bleed conduit system can direct air from the three compressors for a variety of purposes. Air from the APU may be used to start the engines. Air from one engine may be used to start the other in a so-called cross-bleed start. Conduits may extend over the cabin and into the cockpit to heat the cockpit or defrost cockpit windows. Bleed air may be utilized for de-icing of the engines. Bleed air may be utilized to power air conditioners. Additional conduits may run aft into a transition region aft of the cabin and ahead of the tail to an external port on the aircraft fuselage. This port may allow the aircraft to provide or receive compressed air. In one example of a so-called "buddy start", the ports of a donor and recipient aircraft are coupled via a hose. Initially the APU and/or main engines of the donor aircraft are running while those of the recipient are not. Bleed air passes through the hose from the donor to recipient aircraft to start the main engines of the recipient aircraft. This may be appropriate, for example, when the recipient aircraft has a broken APU or simply does not have an APU.

BRIEF SUMMARY OF THE INVENTION

Aspects of the invention relate to aircraft heating systems. Other aspects relate to methods of installing heating systems and installation kits for heating systems. The aircraft has a bleed air conduit along a bleed air flowpath from a turbine engine to an external bleed air port. A heating conduit is coupled to the bleed air conduit to divert air from the bleed air flowpath. A heating system outlet in the aircraft cabin is coupled to the heating conduit for discharging diverted air.

The system may be installed by either tapping into the bleed air conduit or installing the conduit as a replacement for an initial conduit having only two ports along the flowpath. A heating conduit network is installed and coupled to a third port on the bleed air conduit transverse to the first two ports. An electrically controlled valve is installed to selectively block and permit flow of the bleed air through the network. A wiring harness is installed for controlling the valve. A number of mixing ducts are installed having first ports receiving the bleed air and second ports for drawing in cabin air to be mixed with the bleed air.

The kit may include a replacement buddy start tube having a main inlet port at a proximal end, a main outlet port at a distal end, and a lateral tap port smaller than the main inlet and outlet ports. A plurality of conduits are provided for forming a heating conduit assembly. An electrically controlled valve is provided for selectively blocking and permitting flow of air through the assembly. A mixing duct is provided having a first inlet for receiving air from the heating conduit assembly and a second inlet for drawing in air from the aircraft interior for mixing with the air from the heating conduit assembly.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
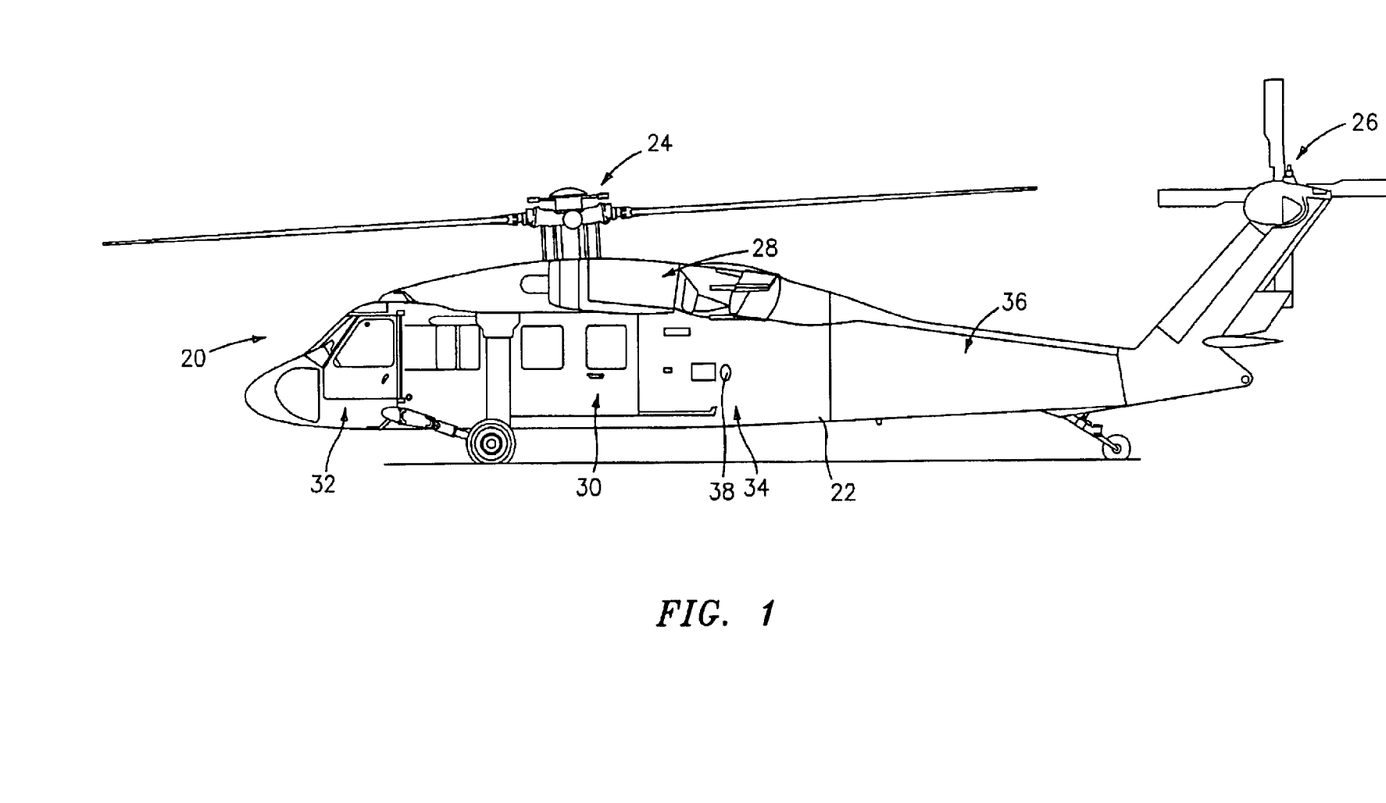
FIG. 1 is a side view of an aircraft.

The present invention may be applied as a retrofit of an existing helicopter. FIG. 1 shows a helicopter 20 having a fuselage 22, a main rotor 24, and a tail rotor 26. The main rotor is powered by a pair of port and starboard engines 28 located above a main passenger cabin 30 of the aircraft. A cockpit 32 is located forward of the cabin and separated therefrom by a wall (not shown). A transition area 34 extends between the cabin 30 and the tail 36. An external port 38 in the fuselage along the transition 34 is coupled via conduits (not shown in FIG. 1) to the engines for discharging bleed air or receiving compressed air. Prior to the exemplary retrofit, the helicopter essentially lacks bleed-powered heating of the cabin. There may be an initial bleed-powered heating system for the cockpit which will remain essentially mechanically unaltered. There may be electric heaters for the cabin which may be removed. The retrofit taps into the flowpath between the engines and the port 38. A conduit along a bleed flowpath between the engines and the port 38 is either tapped into or replaced with a conduit having corresponding main proximal inlet and distal outlet ports along its axis and a third port transverse thereto. The tapped third port of the modified tube or the third port of the replacement tube is used to direct bleed air to a cabin heating system.

Figure 2:
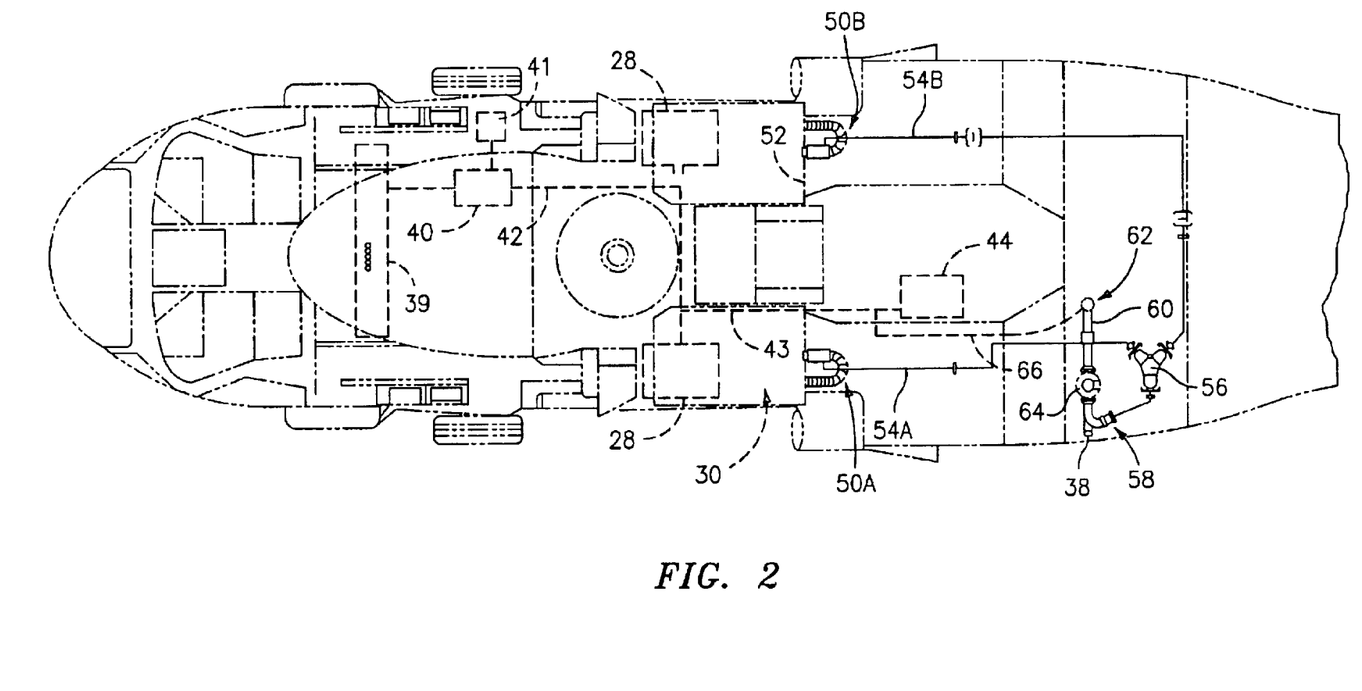
FIG. 2 is a partial X-ray view of the aircraft of FIG. 1.

FIG. 2 partially schematically shows details of the existing cockpit heating system and the retrofit cabin heating system. The existing cockpit heating system includes a duct assembly 39 receiving air from a muffler 40 which, in turn, receives cool air via a blower 41 and warm air via from a conduit branch 42 of a bleed air conduit system 43 linking the port and starboard engines 28 to the APU 44. The cabin heating system has a pair of port and starboard forward facing ejector assemblies 50A and 50B mounted on a partition 52 generally at an aft end of the cabin 30. Conduit branch assemblies 54A and 54B direct bleed air to the respective port and starboard ejectors 50A and 50B. The branch assemblies are coupled to the two branches of a Y-coupler 56, the trunk of which is coupled to a trunk conduit assembly 58 extending to the transverse branch 60 of the replacement/modified bleed air tube/conduit or "buddy tube" 62. A solenoid-controlled valve 64 is located in the trunk conduit assembly for selectively blocking and permitting flow through the trunk conduit assembly 58 and, thus the heating system. The buddy tube is located in the pre-existing flowpath from the bleed air conduit system 43 to the port 38. Specifically, the upstream end of the buddy tube is coupled to a branch 66 extending from the bleed air conduit system 43.

Figure 3:
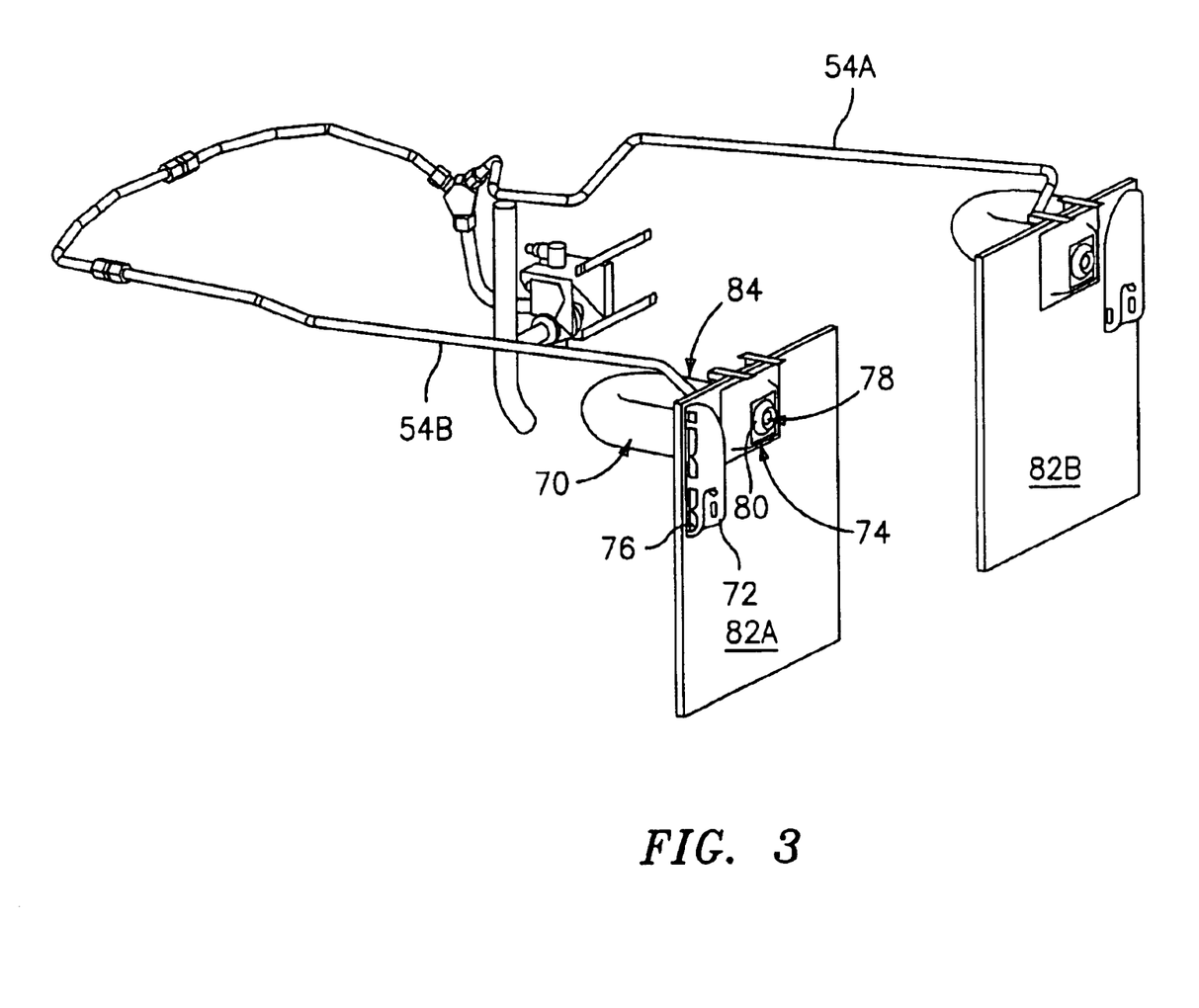
FIG. 3 is a view of air handling portions of an aircraft cabin heating system.

Each ejector assembly 50A, 50B comprises the combination of a mixing duct assembly 70 having an inlet port coupled to an intake manifold assembly 72 and an outlet coupled to a gasper assembly 74. The manifold has inlet ports 76 vertically-arrayed and facing essentially laterally outward. The gasper has an outlet port 78 facing essentially forward. Manual manipulation of the gasper ball 80 make the outlet aimable over a moderate range of essentially forward-facing directions. In the exemplary embodiment, the manifold and gasper assemblies are mounted on associated port or starboard aft panels 82A and 82B of the passenger compartment. The associated duct 70 extends aft of the associated panel into the transition area and is generally U-shaped, forwardly-facing. Along its inboard leg, recessed slightly from the outlet end, the duct has a transverse port 84 coupled to the associated branch 54A or 54B for receiving bleed air.

Figure 4:
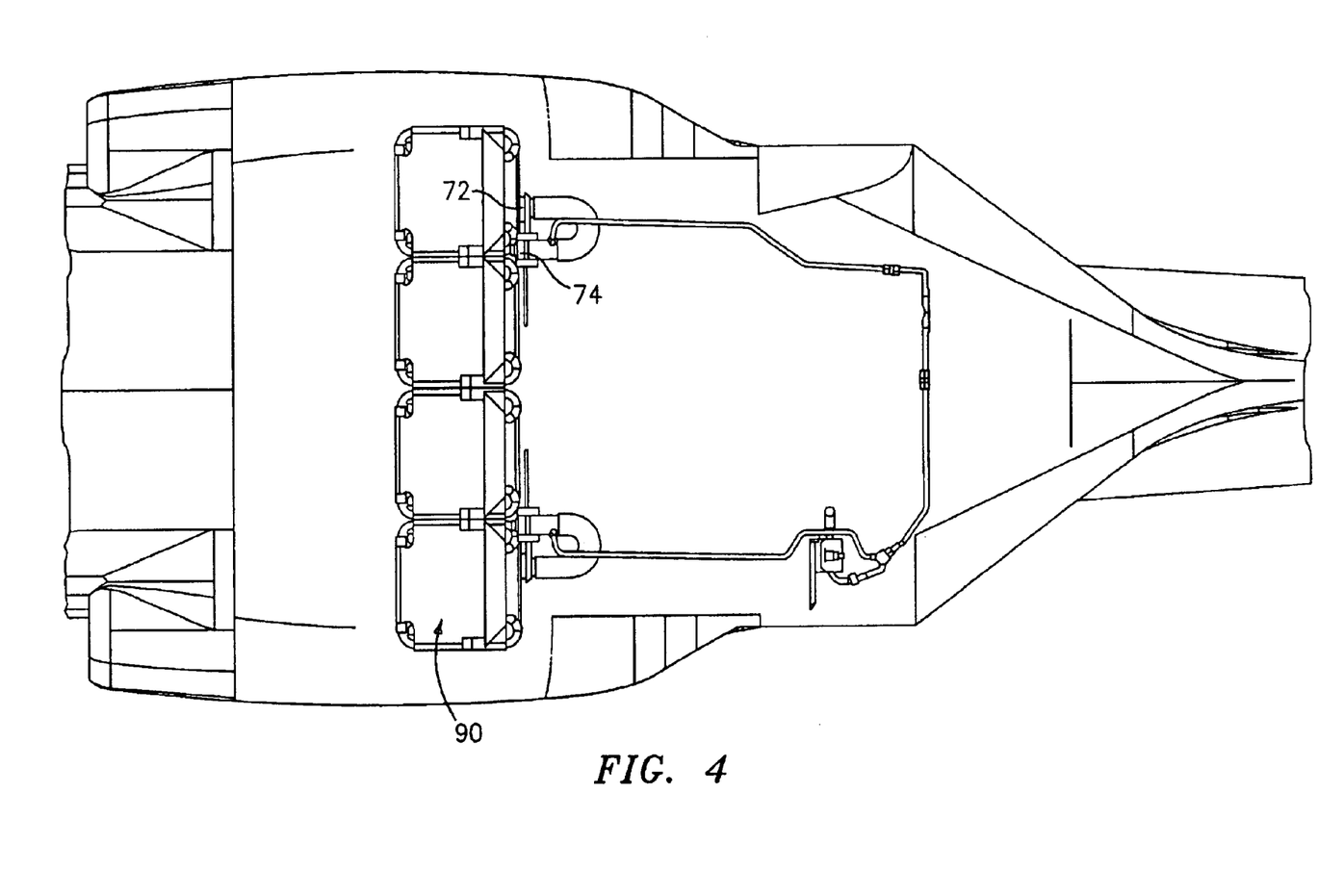
FIG. 4 is a partial top view of the air handling portions of the system of FIG. 3 in an aircraft.
Figure 5:
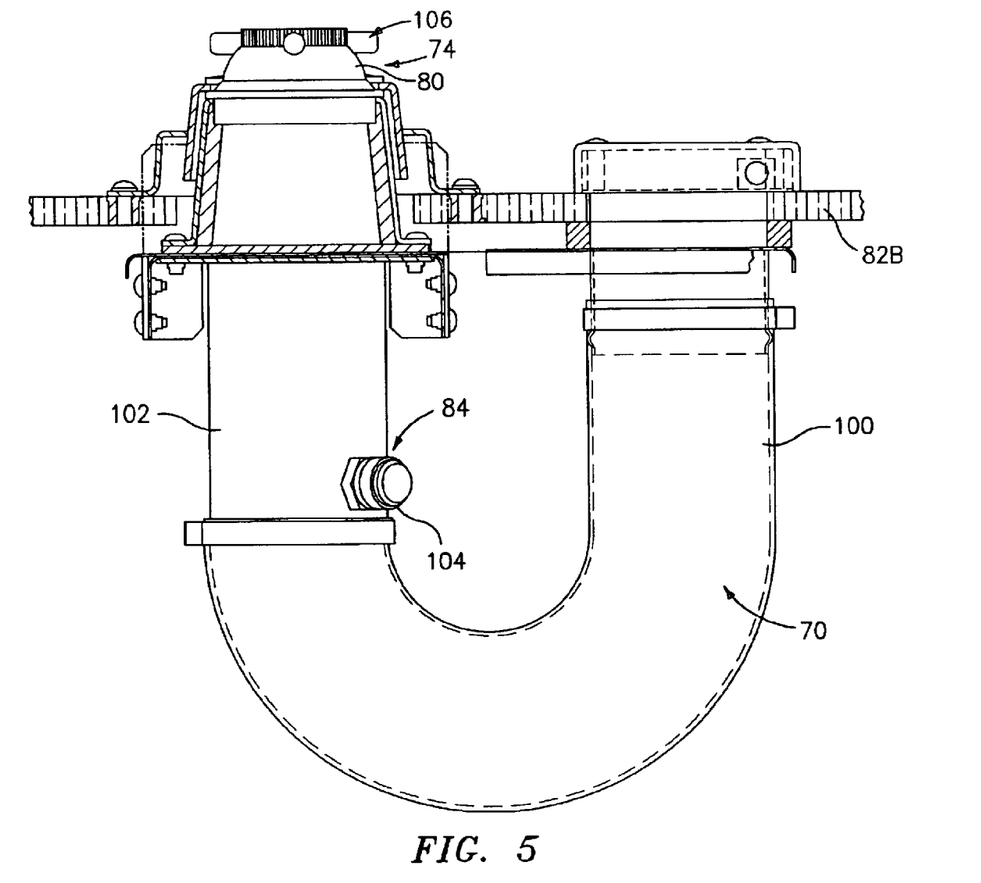
FIG. 5 is a top view of an ejector assembly.
Figure 6:
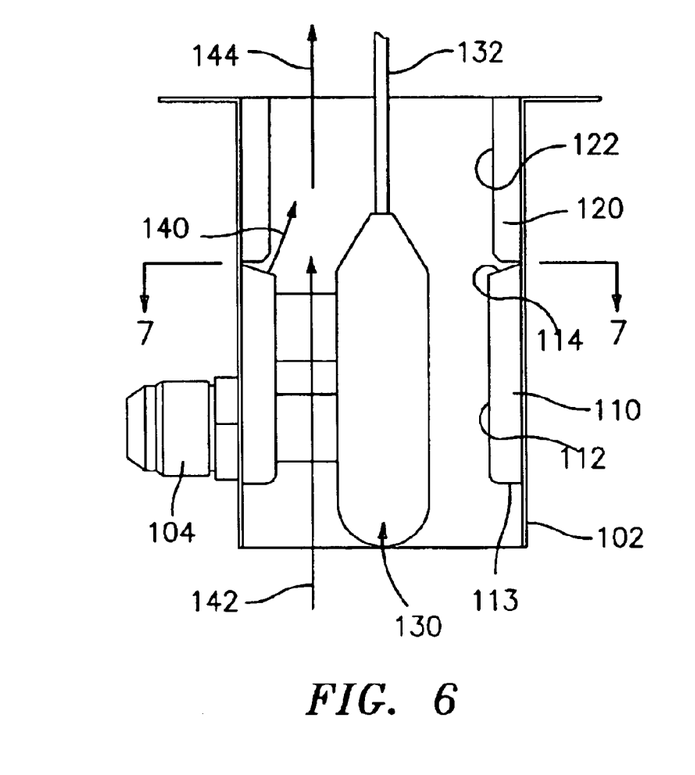
FIG. 6 is a partial longitudinal sectional view of a mixing duct assembly of the ejector assembly of FIG. 5.
Figure 7:
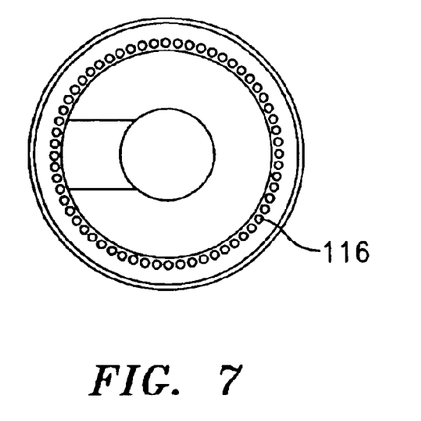
FIG. 7 is a sectional view of the mixing duct of FIG. 6 taken along line 7—7.

FIG. 4 shows an approximate arrangement of the system relative to four forward-facing seats 90 along the aft wall of the cabin. The manifolds 72 are positioned to draw in air from along the sides of the aircraft while the gaspers 74 are positioned to forwardly direct a mixture of the drawn in air and the bleed air. This relative arrangement prevents the occurrence of a short range closed loop of expelled hot air immediately from the gasper returning to the manifold be overheated. FIG. 5 shows further details of an exemplary ejector assembly, namely the starboard ejector. The duct assembly 70 is formed of first and second tubes 100 and 102, coupled end-to-end, the upstream tube 100 being J-shaped and the downstream tube 102 being straight to form a net U shape. Near an upstream (inlet) end of the downstream tube 102 is the fitting 104 for the port 84. The downstream (outlet) end of the tube 102 is coupled to the gasper assembly 74. The gasper assembly has a rotatable control knob 106 for aiming the gasper ball 80 and controlling a valve within the downstream tube 102 for governing flow through the gasper. FIGS. 6 and 7 show further details of the downstream tube 102. The coupling 104 communicates with an annular plenum 110 molded in the tube 102 and having an interior wall 112, a closed upstream wall 113 and a slightly frustoconical (e.g., 15° off radial) downstream wall 114. The downstream wall 114 has a circumferential array of holes 116 (FIG. 7) proximate an inboard extreme of the plenum. The holes are aimed slightly inward with the frustoconical orientation of the wall 114. In the illustrated embodiment, there are sixty holes 0.073 inch in diameter (0.0042 inch$^2$ cross-sectional area) in a single circumferential array of 2.45 inch diameter. Downstream of the holes 116, an annular acoustic foam ring 120 is mounted to the interior of the tube 102 and has an interior surface 122 having a diameter approximately equal or slightly less than hole array diameter. A valve 130, having a fork or linkage 132 coupled to the knob 106 of FIG. 5, adjustably governs bleed flow through the plenum. Flow 140 through the plenum is ejected downstream and slightly inward through the holes 116. This flow, in turn, draws a cabin inlet flow 142 from the upstream end of the tube 102 toward the downstream end of the tube. Thus, the flow 142 is ultimately drawn through the inlet 76 of the manifold 72 and the combined flow 144 is expelled from the gasper. The identified hole array is believed to provide an advantageous balance of the flows 140 and 142 over a range of total flow rates and temperatures of the two flows. A good balance is desirable to provide an appropriate cabin temperature over a variety of conditions while not providing an unacceptably hot combined flow. An exemplary hole diameter range is 0.046 to 0.086 inch, more narrowly, 0.066 to 0.076 inch, with corresponding cross-sectional areas. An exemplary number of holes is 30–100 in a single circumferential array, more narrowly, 50–70.

Figures 8, 9:
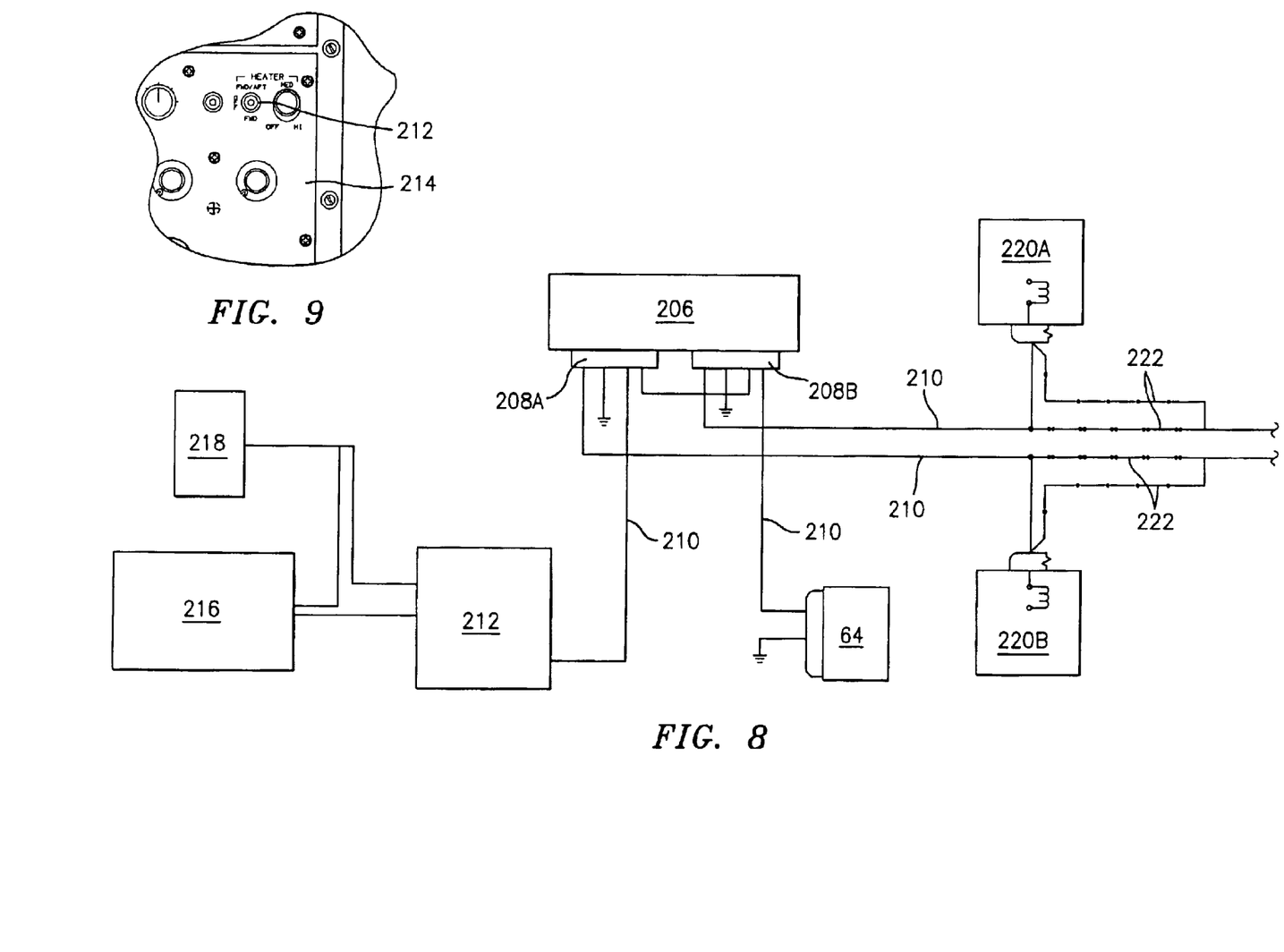
FIG. 8 is a schematic view of electrical components of the aircraft heating system.
FIG. 9 is a partial view of a switch panel having a switch for controlling the cabin heating system.

FIG. 8 schematically shows an electrical system for controlling the solenoid valve 64. The solenoid is mounted on a panel 206 along with relays 208A and 208B. A wiring harness 210 has wires coupling the relays to various controls, sensors, and the like. In the exemplary embodiment, one input is from a cockpit overhead panel switch 212. The exemplary switch 212 (FIG. 9) is a three-way switch providing partially independent control over the cabin heating system and the cockpit heating system. In an exemplary embodiment: in a first position of the switch 212 both heating systems are on; in a second position both are off; and in a third position the cockpit system is on and the cabin system is off. Thus, the control is partially independent in that the cockpit system can be turned on independently of the cabin system but the cabin system may not be turned on independently of the cockpit system. In the exemplary retrofit, the switch 212 replaces a two-way switch that is merely an on/off switch for the cockpit heater. The switch 212 is mounted in an illuminated panel 214 having position markings for the three positions. Accordingly, both the existing switch and the existing illuminated panel having position markings are replaced in the retrofit.

FIG. 8 further shows the coupling of the switch 212 to existing engine anti-ice switches 216 and power 218. Additional inputs are from existing relays which may relate to various functions of the aircraft and which, themselves, may be controlled by additional cockpit switches (not shown). Exemplary existing relays 220A and 220B and their existing associated wiring 222 are engine start interlock relays. The wiring harness is spliced to the existing wiring to close the solenoid valve when either port or starboard engines are being started.

Additional functions associated with the relays may include engine de-icing, buddy starting as a donor, and/or buddy starting as a recipient. The system may be configured so that any or all of these conditions cause the solenoid valve to close to reduce bleed load. Advantageously, the solenoid valve is a fail-closed valve which opens only when energized. Thus, although a failure will deprive the cabin of heat, it will not interfere with the other functionalities.

The retrofit kit may advantageously be packaged in one or more containers (e.g., cartons) and may include some or all of the following:

the replacement buddy start tube which may replace a distal tube in the flowpath from the engine just upstream of the coupler/check valve 38, an exemplary tube being of nominal 1.5 inch diameter along its main length between inlet and outlet ports and nominal one inch diameter along the branch to the third port;

the solenoid valve having a nominal one inch (e.g., 1.02 inch) passageway;

the V-coupler 56 having a nominal one inch trunk and two nominal 0.75 inch diameter branches;

a pre-bent nominal one inch diameter seamless cres tube and associated couplers for coupling the solenoid valve to the replacement buddy start tube;

multiple pre-bent nominal one inch diameter seamless aluminum tubes and associated couplers for coupling the solenoid valve to the Y-coupler;

multiple pre-bent nominal 0.75 inch diameter seamless aluminum tubes and associated couplers for coupling the respective branches of the Y-coupler to the ejector assemblies;

the ejector assemblies, either pre-assembled, partially assembled, or substantially disassembled;

the wiring harness;

the switch;

the relays;

miscellaneous custom mechanical parts such as a mounting bracket for the solenoid and relays;

miscellaneous stock mechanical and electrical hardware such as bolts, nut, washers, clamps, rivets, clips, wire sleeves, and the like;

the replacement illuminated cockpit panel;

templates for guiding various drilling and cutting operations; and instructions.

An exemplary retrofit process is as follows. A general sequence involves initial disassembly of various aircraft components to permit subsequent installation. Installation may involve electrical installation, followed by rough mechanical assembly followed by finish mechanical assembly (e.g., tightening, securing, clamping, etc.). This may be followed by reassembly of aircraft components. The initial disassembly stage provides access for installation. The key area is access to the ceiling of the cabin and cockpit to run the wiring harness. This first involves removal of control rod cover doors (broom closet cover doors) and the structural "H-bar" at the front of the cabin to which the rear facing front seats are mounted. This permits removal of the cabin and cockpit ceiling soft paneling. The existing illuminated panel and switch are removed and replaced with parts from the kit. The harness may be put in place and electrically connected to the switch, and other existing components. In running the harness through the broom closet, several of the control rods may need to be removed and reinstalled. The harness may be routed to parallel existing harnesses extending to the transition section. The initial buddy tube is removed along with its rubber couplings. The replacement buddy tube may be loosely installed using those couplings or replacements. The solenoid/relay mounting bracket is positioned on the frame of the aircraft and aligned with existing rivets which are drilled out and replaced to mount the bracket. Where no existing rivets are provided, holes are drilled in the frame and new rivets installed. The tube/couplings connecting the solenoid valve to the buddy tube are loosely installed. The remainder of the cabin heating conduit system may then be installed in a downstream direction. An exemplary routing involves routing the conduits over fuel cells high in the transition section. The routing may involve drilling out rivets or drilling holes in the frame for clamps to secure the tubes to the frame. Templates may be used to guide hole locations in the aft panels of the cabin (the transition access panels). The ejectors are assembled and mounted and secured in place. The plumbing connections may be tightened and clamps/clips securing the tubes may be tightened. Exemplary tightening may proceed upstream from the ejectors. The portions of the aircraft which were disassembled to facilitate installation may then be reassembled.

One advantage of the exemplary retrofit is cost savings relative to a more ambitious retrofit such as also replacing the cockpit system with a combined system. By merely adding heat for the cabin, positioning the ducts near the rear of the cabin, and drawing air from an existing bleed flowpath also to the rear of the cabin, a relatively small amount of rework is required.

One or more embodiments of the present invention have been described. Nevertheless, it will be understood that various modifications may be made without departing from the spirit and scope of the invention. For example, the particular configuration of the aircraft being retrofitted may influence details of the retrofit. Accordingly, other embodiments are within the scope of the following claims.

What is claimed is:

1. A heating system for an aircraft comprising:
   a bleed air conduit along a bleed air flowpath from at least one turbine engine to an external bleed air port on the aircraft separate from the heating system;
   at least one heating conduit coupled to the bleed air conduit to divert air from the bleed air flowpath bypassing the external bleed air port; and
   a heating system outlet in the aircraft cabin and coupled to the at least one heating conduit for discharging diverted air.

2. The heating system of claim 1 wherein the at least one heating conduit is an assembly having:
   a trunk having an effective cross-sectional area smaller than an effective cross-sectional area of the bleed air conduit;
   port and starboard branches each having an effective cross-sectional area smaller than the effective cross-sectional area of the trunk; and
   an electrically controlled valve in or adjacent the trunk for selectively blocking the trunk.

3. The heating system of claim 1 further comprising:
   an electrically controlled valve coupled to the at least one heating conduit to selectively block and permit flow of the diverted air; and
   a switch in a cockpit of the aircraft electrically coupled to the valve to control the valve.

4. The heating system of claim 1 further comprising at least one mixing duct and gasper assembly having:
   a cabin air inlet positioned in the aircraft cabin to draw in cabin air;
   a bleed air inlet coupled to the at least one heating conduit to receive the diverted air; and
   a gasper having an inlet receiving a mixture of the cabin air and the diverted air and an outlet defining the heating system outlet, the outlet being manually aimable.

5. The heating system of claim 4 comprising port and starboard such mixing duct and gasper assemblies positioned proximate an aft wall of the cabin and the heating system outlets face essentially forward and the cabin air inlets face essentially laterally outward.

6. The heating system of claim 1 wherein the bleed air conduit is located aft of the cabin.

7. The heating system of claim 1 in combination with an independent heating system for a cockpit of the aircraft.

8. The heating system of claim 1 wherein the at least one turbine engine comprises:
   an auxiliary power unit; and
   two main engines, the bleed air flowpath extending from each of the auxiliary power unit and two main engines.

9. The heating system of claim 1 wherein the bleed air port comprises a coupler moiety having a manually-actuated valve.

10. The heating system of claim 1 installed in a rotary wing aircraft.

11. A method for installing a cabin heating system in an aircraft, the aircraft having at least one turbine engine and a bleed air flowpath from the at least one turbine engine to a bleed air port, the method comprising:
   at least one of:
      replacing a conduit having first and second ports along the bleed air flowpath with a replacement conduit having first, second and third ports; and
      tapping into a conduit having first and second ports along the bleed air flowpath to create a third port;
   installing a heating conduit network coupled to the third port to draw bleed air from the third port;
   installing an electrically controlled valve to selectively block and permit flow of the bleed air through the heating conduit network;
   installing a wiring harness for controlling the electrically controlled valve; and
   installing a plurality of mixing ducts having first ports for receiving the bleed air and second ports for drawing in cabin air to be mixed with the bleed air.

12. The method of claim 11 wherein either:
   the installing of the plurality of mixing ducts comprises installing the mixing ducts assembled with respective gaspers; or
   the method further comprises installing a plurality of gaspers to respective ones of the plurality of mixing ducts.

13. The method of claim 11 further comprising:
   removing an original heater switch from a cockpit of the aircraft and installing a replacement switch in place of the original switch, the original switch controlling a cockpit heater and the replacement switch controlling the cockpit heater and the cabin heating system at least partially independently.

14. An aircraft heating system kit, comprising:
   a replacement buddy start tube, having a main inlet port at a proximal end, a main outlet port at a distal end, and a lateral tap port, smaller than the main inlet port and main outlet port;
   a plurality of conduits for forming a heating conduit assembly for drawing air through the tap port;
   an electrically controlled valve for selectively blocking and permitting flow of air through the heating conduit assembly; and
   a mixing duct having a first inlet for receiving air from the heating conduit assembly and a second inlet for drawing in air from the aircraft interior for mixing with the air from the heating conduit assembly.

15. The kit of claim 14 further comprising:
   a replacement heater switch for mounting in the cockpit; and
   a wiring harness for coupling the replacement heater switch to the electrically controlled valve.

16. The kit of claim 14 wherein:
   there are port and starboard such mixing ducts; and
   the kit further comprises port and starboard gaspers assembled to the respective port and starboard mixing ducts.

17. The kit of claim 15 wherein:
   the replacement heater switch has positions for at least partially independently controlling a cockpit heater and a cabin heating system.

18. The method of claim 11 comprising said tapping.

19. The method of claim 11 comprising said replacing and wherein:
   said conduit has only first and second ports.

20. The method of claim 11 performed on an aircraft wherein said aircraft has not previously had a bleed air cabin heating system.

* * * * *